(12) United States Patent
MacMillian et al.

(10) Patent No.: US 11,292,331 B2
(45) Date of Patent: Apr. 5, 2022

(54) DRIVE TRAIN UNIT FOR A HYBRID VEHICLE, TRANSMISSION UNIT AND DRIVE TRAIN

(71) Applicant: Schaeffler Technologies AG & Co. KG, Herzogenaurach (DE)

(72) Inventors: Loyal George MacMillian, Karlsruhe (DE); Götz Rathke, Hohberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/734,045

(22) PCT Filed: May 10, 2019

(86) PCT No.: PCT/DE2019/100421
§ 371 (c)(1),
(2) Date: Dec. 1, 2020

(87) PCT Pub. No.: WO2019/233510
PCT Pub. Date: Dec. 12, 2019

(65) Prior Publication Data
US 2021/0213825 A1      Jul. 15, 2021

(30) Foreign Application Priority Data

Jun. 4, 2018   (DE) ...................... 10 2018 113 223.9
Apr. 10, 2019  (DE) ...................... 10 2019 109 432.1

(51) Int. Cl.
*B60K 6/48*      (2007.10)
*B60K 6/387*     (2007.10)
(Continued)

(52) U.S. Cl.
CPC .............. *B60K 6/387* (2013.01); *B60K 6/405* (2013.01); *F16D 13/52* (2013.01); *F16D 23/14* (2013.01);
(Continued)

(58) Field of Classification Search
CPC .......... B60K 6/387; B60K 6/405; B60K 6/52; B60K 6/48; B60K 2006/4808;
(Continued)

(56) References Cited

U.S. PATENT DOCUMENTS 9,005,070 B2 * 4/2015 Hoffmann ............... F16D 21/00
                                                   475/269
2007/0089962 A1 * 4/2007 Enstrom ................ B60K 6/387
                                                   192/48.614

(Continued)

FOREIGN PATENT DOCUMENTS

DE        10033649 A1   2/2001
DE     102004009832 A1  9/2004
(Continued)

*Primary Examiner* — David J Hlavka
(74) *Attorney, Agent, or Firm* — Kevin Parks

(57) ABSTRACT

A drive train unit for a hybrid vehicle includes an input shaft arranged for rotationally fixed attachment to an output of a transmission, an output shaft, an electric machine with a rotor, a clutch, and an actuating unit operatively connected to the clutch. The actuating unit has an actuator and an actuating bearing, displaceable by the actuator. The clutch may be a separating clutch operatively inserted between the rotor and the input shaft, or a friction clutch operatively inserted between the input shaft and the output shaft. The clutch may be a self-intensifying clutch with a leaf spring adjusted at a set angle relative to a reference plane oriented perpendicular to an axis of rotation such that, in a driving direction of a first clutch component, a first friction element is applied to a second friction element with an additional axial force.

10 Claims, 8 Drawing Sheets

(51) Int. Cl.
*B60K 6/405* (2007.10)
*F16D 13/52* (2006.01)
*F16D 23/14* (2006.01)
*B60K 6/52* (2007.10)
*F16D 23/12* (2006.01)

(52) U.S. Cl.
CPC ............... *B60K 6/48* (2013.01); *B60K 6/52* (2013.01); *B60K 2006/4808* (2013.01); *B60K 2006/4825* (2013.01); *B60Y 2200/92* (2013.01); *B60Y 2400/424* (2013.01); *F16D 2023/126* (2013.01)

(58) Field of Classification Search
CPC .... B60K 2006/4825; B60K 2006/4833; B60K 6/20; F16D 13/52; F16D 23/14; F16D 2023/126; F16D 2023/141; F16D 21/02; B60Y 2200/92
See application file for complete search history.

(56) References Cited

U.S. PATENT DOCUMENTS

| | | | |
|---|---|---|---|
| 2011/0114436 A1* | 5/2011 | Noehl | F16D 25/123 |
| | | | 192/48.601 |
| 2015/0083546 A1* | 3/2015 | Moser | F16D 23/14 |
| | | | 192/41 R |
| 2016/0311309 A1* | 10/2016 | Venturi | B60K 6/48 |
| 2017/0050506 A1* | 2/2017 | Trinkenschuh | F16D 25/0638 |
| 2017/0259662 A1* | 9/2017 | Meixner | B60K 6/387 |
| 2018/0244145 A1* | 8/2018 | Ohnemus | F16D 13/52 |
| 2018/0313411 A1* | 11/2018 | Satoyoshi | B60L 15/2054 |

FOREIGN PATENT DOCUMENTS

| | | |
|---|---|---|
| DE | 102012211487 A1 | 1/2014 |
| DE | 102014218878 B3 | 2/2016 |
| DE | 102015225421 A1 | 6/2017 |
| EP | 2971828 A1 | 1/2016 |

* cited by examiner

DRIVE TRAIN UNIT FOR A HYBRID VEHICLE, TRANSMISSION UNIT AND DRIVE TRAIN

CROSS-REFERENCE TO RELATED APPLICATIONS

This application is the United States National Phase of PCT Appln. No. PCT/DE2019/100421 filed May 10, 2019, which claims priority to German Application Nos. DE102019109432.1 filed Apr. 10, 2019 and DE102018113223.9 filed Jun. 4, 2018, the entire disclosures of which are incorporated by reference herein.

TECHNICAL FIELD

The disclosure relates to a drive train unit for a hybrid vehicle/hybrid drivable vehicle, such as a car, truck, bus or other commercial vehicle. The disclosure also relates to a transmission unit having said drive train unit and a drive train.

BACKGROUND

Automatic transmissions for motor vehicles are generally known from the prior art. So-called P3-E machines are also already known, which are arranged at a transmission output of the automatic transmission and can be coupled and uncoupled by means of a separating clutch. A further clutch ensures that an output of the transmission, in addition to its coupling with the wheels of a front axle, is selectively coupled with the wheels of a rear axle to implement an all-wheel drive.

However, a disadvantage of the designs known from the prior art has turned out to be that they are often relatively large in size.

SUMMARY

The disclosure provides a drive train unit that is designed to transmit higher torques and has been further optimized with regard to its required installation space.

A drive train unit for a hybrid vehicle, having an input shaft prepared for rotationally fixed attachment to an output of a transmission, an electric machine, a separating clutch inserted between a rotor of the electric machine and the input shaft, and a friction clutch operatively inserted between the input shaft and an output shaft is described. An actuating unit is operatively connected to the separating clutch and/or to the friction clutch, which actuating unit has a lever actuator or a hinge actuator and an actuating bearing which can be displaced by the lever actuator or the hinge actuator.

Equipping the friction clutch with a lever actuator means that high drive torques can be transmitted. At the same time, the structure, e.g., in the axial direction, is made compact. A so-called "corner energy" (engagement force times engagement travel) on the part of an actuation can also be kept small in order to use actuators (actuating units) that have low energy consumption.

If the separating clutch and/or the friction clutch are designed as a self-intensifying clutch, they are designed to be more robust for the transmission of higher torques.

A first clutch component of the friction clutch may have a first carrier part accommodating at least one first friction element and a second carrier part connected in a rotationally fixed manner to the first carrier part by means of at least one leaf spring unit. A leaf spring of the at least one leaf spring unit is configured and, in the closed position, is adjusted at a set angle relative to a reference plane oriented normal to an axis of rotation of the input shaft in such a way that the at least one first friction element is applied to at least one second friction element of a second clutch component with an additional axial force in a driving direction of rotation of the first clutch component.

If the at least one leaf spring unit has a plurality of leaf springs arranged to form a leaf spring assembly, it is designed to generate a high axial force. The leaf springs of the leaf spring unit lie flat on top of one another in a typical manner and run parallel to one another. Each leaf spring is fixed with a first end to the first carrier part and with a second end to the second carrier part.

If several leaf spring units are arranged distributed along a circumference/in a circumferential direction of the carrier parts, a uniform transmission of the axial force takes place. If the at least one leaf spring unit is arranged radially inside the friction elements, a compact design of the friction clutch is made possible.

In addition, an actuating force introduction mechanism which has at least one lever element and/or a pressure pot and is operatively connected to a lever actuator or a hinge actuator may be received on the second carrier part. As a result, the component responsible for introducing the axial force/actuating force can be received in a stable manner. If the actuating force introduction mechanism has a pressing plate which is connected to the first carrier part and has a sliding effect on the entirety of the friction elements, the actuating force is transmitted in a stable manner by the friction elements.

The disclosure also relates to a transmission unit for a hybrid vehicle, having said drive train unit and a transmission connected to the input shaft of the drive train unit. The disclosure further relates to a drive train for a hybrid vehicle, with the transmission unit and a differential gear coupled in a non-rotationally fixed manner to the output shaft of the drive train unit.

In other words, according to the disclosure, a hybrid transmission (transmission unit) is made available which has an (automatic) transmission and an electric machine which is axially offset therefrom and is arranged at an output of the transmission. The electric machine can be coupled to/decoupled from a drive train using a separating clutch. In addition, a further (second) clutch can optionally be provided, which is designed for coupling/decoupling a drive shaft (output shaft) connected to a differential gear. The electric machine and the at least one clutch or the two clutches together form a module. Thus, disk springs/leaf springs (of the further clutch) are provided with a set angle in a closed state (of the further clutch). The further clutch is actuated by a lever to enable an all-wheel clutch to transmit high torque.

BRIEF DESCRIPTION OF THE DRAWINGS

The disclosure will now be explained in more detail with reference to figures, in which context various exemplary embodiments are also shown. In the figures:

FIG. 3 shows a detailed longitudinal sectional view of the drive train unit according to FIG. 1 in the region of a self-intensifying, further clutch provided in addition to the separating clutch, FIG. 4 shows a schematic representation of a peripheral region of the further clutch according to FIG. 3, in which region a leaf spring unit can be seen which has a certain set angle when the further clutch is closed, FIG. 5 shows a diagram to illustrate a relationship between a gain factor and the set angle of the leaf springs of the leaf spring unit (leaf spring angle) of the further clutch according to FIG. 3, FIG. 6 shows a schematic view of a drive train used in a motor vehicle, in which the drive train unit according to FIG. 1 is used, FIG. 7 shows a schematic representation of a control system that can be used to control the separating clutch, FIG. 8 shows a schematic representation of a control system that can be used to control the two clutches of the drive train unit according to FIG. 1.

DETAILED DESCRIPTION

The figures are only schematic in nature and serve only for understanding the disclosure. The same elements are provided with the same reference symbols. The different features of the various exemplary embodiments can also be freely combined with one another.

Figure 1:
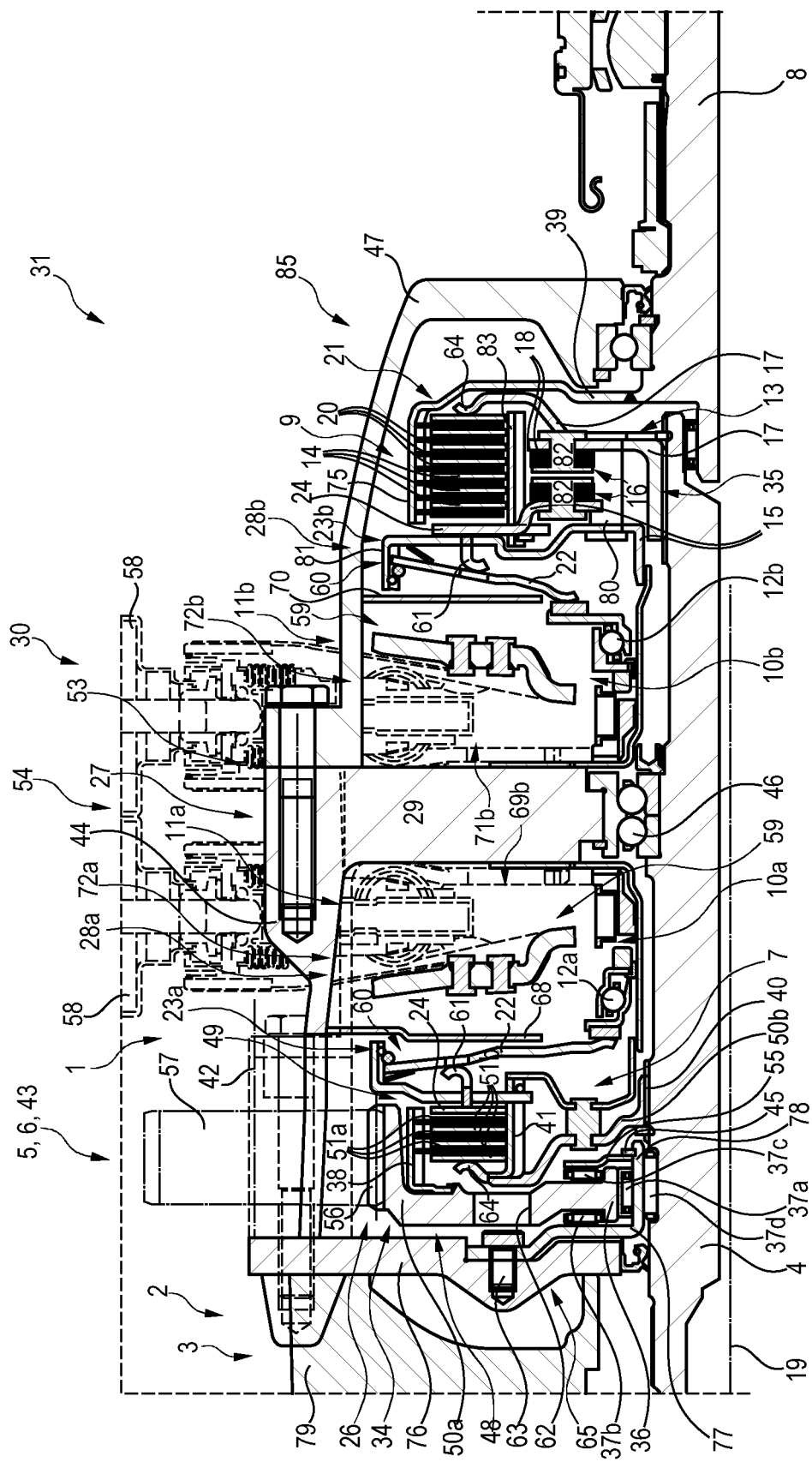
FIG. 1 shows a longitudinal sectional view of a drive train unit integrated in a transmission unit, according to a first exemplary embodiment, wherein the drive train unit has two different clutches and, for the sake of clarity, the view of an electric machine is omitted.

FIG. 1 shows a drive train unit 1 constructed according to a first exemplary embodiment. The drive train unit 1 is already operatively connected to a transmission 3, which is only indicated with regard to its position in FIG. 1 and is further illustrated in FIG. 6. The drive train unit 1 forms a transmission unit 30 with this transmission 3. The transmission 3 is implemented as an automatic transmission. An output 2 (in the form of a transmission output shaft) of the transmission 3 is connected in a rotationally fixed manner to an input shaft 4 of the drive train unit 1. The output 2 may be connected to the input shaft 4 via a toothing in a rotationally fixed manner.

The transmission unit 30 may be used in a drive train 31 of a hybrid all-wheel drive vehicle, as can be seen in FIG. 6. The transmission 3 is operatively connected on the input side in a typical manner to an internal combustion engine 33. The drive train unit 1 is inserted between the transmission 3 and a Cardan shaft 25 which is connected to a differential gear 32 on a rear axle of the motor vehicle. The Cardan shaft 25 is fixed in a rotationally fixed manner to an output shaft 8 of the drive train unit 1. The drive train unit 1 has a clutch device 54 with two clutches 7, 9 and an electric machine 5, which is indicated in principle with regard to its position.

Returning to FIG. 1, it can also be seen that the drive train unit 1 has a housing 27 which essentially forms two housing regions 28a, 28b separated from one another by a housing wall 29/partition wall. In a first housing region 28a of the housing 27, a first clutch 7, which is referred to below as a separating clutch 7, is housed radially outside the centrally arranged input shaft 4, the axis of rotation/longitudinal axis of which is has the reference sign 19. The separating clutch 7 is implemented as a friction plate clutch. The input shaft 4 is supported on a radial inside of the housing wall 29 by a support bearing 46, designed here as a double ball bearing/double-row groove ball bearing. The separating clutch 7 is rotatably coupled with its first clutch component 48 to a rotor 6 of the electric machine 5.

The first clutch component 48 has a plurality of first friction plates 51a, which are typically connected to a plurality of second friction plates 51b of the second clutch component 49 of the separating clutch 7 in a rotationally fixed manner (closed position) or are rotationally decoupled therefrom (open position) for the design as a friction plate clutch. The first and second friction plates 51a, 51b are arranged alternately with one another in the axial direction. The separating clutch 7 is moved back and forth between its closed position and its open position by a first actuating unit 10a. The friction plates 51a, 51b are to be understood as units having a friction lining on a support element either on one side or on both sides.

As explained in more detail below, the first actuating unit 10a is equipped with a (first) axial force actuator in the form of a first lever actuator 11a, which has an adjusting effect on a first actuating bearing 12a. The first actuating bearing 12a in turn serves to shift the first and second friction plates 51a, 51b. The first lever actuator 11a, and the second lever actuator 11b described below, are each implemented in a known manner. In this connection, reference is made by way of example to the release system of DE 10 2004 009 832 A1, the structure and function of which is considered to be integrated therein for the respective lever actuator 11a, 11b. Accordingly, the respective lever actuator 11a, 11b has an electric motor 58 which, for example, interacts with a ramp element to adjust it via a spindle drive. The ramp element is axially adjustable by means of a pivot point which can be moved along its radial ramp contour and which can be adjusted by the spindle drive. Due to the axial coupling of the ramp element to the actuating bearing 12a, 12b, the respective actuating bearing 12a, 12b is displaced and the corresponding clutch is actuated.

In a further embodiment, the respective axial force actuator is alternatively implemented as a hinge actuator. In this connection, reference is made to DE 10 2012 211 487 A1, which describes such a hinge actuator, the design of which is considered to be integrated therein for the respective axial force actuator. Accordingly, in the further embodiment, the first axial force actuator is implemented as a first hinge actuator and/or the second axial force actuator is implemented as a second hinge actuator.

The first clutch component 48 also has a (first) carrier 50a which is rotatably mounted relative to the housing 27, namely to a bearing flange unit 65 connected to the housing 27 and forming the housing 27, which is referred to simply as the bearing flange 65 in the following. For this purpose, the first carrier 50a has a bearing base 36 on its radial inside, which is supported on the bearing flange 65 via a plurality of roller bearings 37a, 37b, 37c in the axial direction and in the radial direction. From this bearing base 36, the first carrier 50a extends radially outwards in a substantially disk-shaped manner with respect to the axis of rotation 19. On a radial outer side, the first carrier 50a forms a toothing 56 (external toothing) which is coupled in a rotationally fixed manner with the rotor 6, as described in more detail below.

A (first) receiving region 38 projecting in the axial direction is provided radially inside the toothing 56 on the first carrier 50a, which first receiving region 38 serves directly to receive the first friction plates 51a in a rotationally fixed manner. The receiving region 38 is also part of the first clutch component 48. In addition, the first friction plates 51a are received on the first receiving region 38 so as to be displaceable relative to one another in the axial direction. The first friction plates 51a are arranged towards a radial inside of the first receiving region 38, so that the first carrier 50a forms an outer plate carrier of the separating clutch 7. The first carrier 50a extends in such a way that the first friction plates 51a are arranged in the radial direction outside the bearing base 36 and radially inside the toothing 56.

The second clutch component 49 is permanently coupled to the input shaft 4 in a rotationally fixed manner. For this purpose the second clutch component 49 has a (second) carrier 50b. The second carrier 50b is connected in a rotationally fixed manner to the input shaft 4 via a serration 40. The second carrier 50b has a first sleeve region 41 which extends in the axial direction and to the radial outer side of which the second friction plates 51b are arranged in a rotationally fixed manner and displaceable relative to one another in the axial direction. The second carrier 50b thus forms an inner plate carrier of the separating clutch 7.

In this embodiment, the electric machine 5 with its rotor 6, which in turn can be rotated about a rotor axis of rotation 42, is arranged radially outside the input shaft 4. A rotor shaft 43 (FIG. 6) of the rotor 6 is arranged radially offset, here essentially parallel to the axis of rotation 19. To couple the rotor 6 to the first carrier 50a, a gear stage 26 is provided. A gearwheel 57, shown in dashed lines in FIG. 1, is permanently in meshing engagement with the toothing 56. The gearwheel 57 is directly connected to the rotor shaft 43 (FIG. 6) in a rotationally fixed manner and is thus arranged coaxially to the rotor 6. If the separating clutch 7 is in an open position, it is possible to let the electric machine 5/the rotor 6 stand still. In a closed position of the separating clutch 7, the electric machine 5 can typically be operated. In further embodiments, instead of the gear stage 26, a coupling of the rotor 6 via an endless traction means, such as a belt or chain, with the toothing 56 which is then correspondingly adapted to the endless traction means is provided.

With regard to the bearing flange 65, which supports the first carrier 50a, it can also be seen that it is essentially implemented in two parts, but a one-part design according to further embodiments is also possible. A disk-shaped base body 76 of the bearing flange 65 is connected to a main housing component 44 of the housing 27 that forms the housing wall 29. In this embodiment, the base body 76, like the main housing component 44, is made of an aluminum material (a cast aluminum material) and itself forms a crank.

A support element 77 of the bearing flange 65 is connected to the base body 76. The support element 77 is fastened to the base body 76 (in the region of its crank) via a plurality of fasteners 63, here screws, which are distributed in the circumferential direction. For easier attachment of the fasteners 63, axial through holes 62 are made in the first carrier 50a at the radial height of the fasteners 63. Each of these through holes 62 is axially aligned with fasteners 63 in an initial position/assembly position. The support element 77 may be made from a formed steel material. The support element 77 has a bearing region 78 which forms a crank.

The bearing region 78 constitutes an axial projection on which the first carrier 50a is supported radially from the outside. The first carrier 50a is mounted on the bearing region 78 via a first roller bearing 37a serving as a radial bearing. On a side of the first carrier 50a facing the base body 76 in the axial direction, a second roller bearing 37b is arranged between the support element 77 and the first carrier 50a, forming an axial bearing. A third roller bearing 37c, which also forms an axial bearing, is arranged on a side of the first carrier 50a axially facing away from the base body 76. This third roller bearing 37c is arranged in the axial direction between the first carrier 50a and a shim 55 in the form of a shim disk, which is received on the support element 77 in an axially fixed manner. The shim 55 is fixed directly to the bearing region 78 by means of a securing ring 45. The input shaft 4 is mounted radially from the inside on the bearing region 78 via a fourth roller bearing 37d relative to the housing 27. With regard to the first to fourth roller bearings 37a to 37d, it should be pointed out that although these are implemented as needle bearings in this embodiment, they can also be implemented in other ways, for example as ball bearings, in other embodiments.

The housing wall 29 divides the housing 27 into the first housing region 28a and the second housing region 28b. The second housing region 28b is delimited by a secondary housing component 47 which forms a bell and which is fastened to the main housing component 44. A further, second clutch 9 is arranged in the second housing region 28b. The second clutch 9, which is simply referred to as a clutch in the following, is also implemented as a friction clutch, namely a friction plate clutch. For example, as explained in more detail below, this clutch 9 may be implemented as a self-intensifying clutch 9. A first clutch component 13 of the clutch 9 is connected to the input shaft 4 in a rotationally fixed manner. A second clutch component 21 of the clutch 9 is connected in a non-rotationally fixed manner to the output shaft 8, which output shaft 8, as already described, is connected to the Cardan shaft 25.

The first clutch component 13 of the clutch 9 has a first carrier 35 (of the clutch 9) as well as a plurality of first friction elements 14 (of the clutch 9), which are axially displaceable relative to one another and received on the first carrier 35 in a rotationally fixed manner. The first friction elements 14 are implemented as friction plates. The first friction elements 14 alternate in the axial direction with second friction elements 20 of the second clutch component 21 of the clutch 9, which are likewise implemented as friction plates. The second friction elements 20 are in turn mounted on a second carrier 39 (of the clutch 9) in a rotationally fixed manner and axially displaceable relative to one another. The second carrier 39 is directly connected to the output shaft 8 (here via a weld). To adjust the clutch 9 between its open position and its closed position, a second actuating unit 10*b* is provided in the second housing region 28*b*.

The second actuating unit 10*b* is, as explained in more detail below, equipped with a (second) axial force actuator in the form of a second lever actuator 11*b*, which has an adjusting effect on a second actuating bearing 12*b*. The second actuating bearing 12*b* in turn serves to move the first and second friction elements 14, 20.

Figure 17:
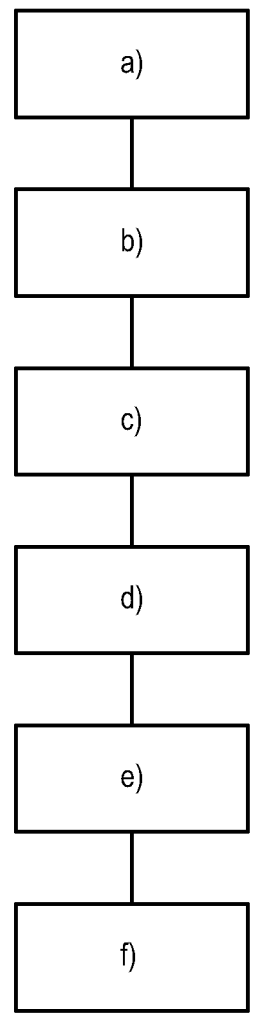
FIG. 17 shows a schematic view to illustrate an assembly method of the drive train unit according to FIG. 1.

In connection with FIGS. 1 and 17, reference should also be made to an example method of assembling the drive train unit 1 or the transmission unit 30. In a first step a), the bearing flange 65 is attached to the transmission housing, namely screwed to this transmission housing 79. In this first step a), the electric machine 5 is also attached to the transmission housing.

In a second step b), a first module 34 is provided. The bearing flange 65 together with the first carrier 50*a* of the separating clutch 7 mounted thereon forms the common first module 34. The first carrier 50*a* is mounted together with the first to third roller bearings 37*a*, 37*b*, 37*c* on the support element 77 fastened to the base body 76. In addition, in the second step b), the rotor 6 of the electric machine 5 is connected to the first carrier 50*a* of the separating clutch 7 via the gear stage 26. The gear stage 26, i.e., the gearwheel 57 including its mounting and the electric machine 5 are already pre-assembled in step a). In addition, the axial play of the first carrier 50*a* of the separating clutch 7 is adjusted by means of the shim 55. It should be noted that, according to a further embodiment, the first module 34 is first installed separately (according to step b)) and then attached (according to step a)) to the transmission housing 79 by fastening the bearing flange 65.

In a third step c), the central input shaft 4 is mounted via the support bearing 46 on the radially inwardly projecting housing wall 29. The support bearing 46 is consequently preloaded between the main housing component 44 and the input shaft 4. The support bearing 46 is thus firmly fixed between the housing 27 and the input shaft 4. In this third step c), the main housing component 44 is still spaced apart/disassembled from the bearing flange 65 and the other components of the housing 27. The input shaft 4 is also arranged separately from the separating clutch 7.

In a fourth step d), a first lever actuator 11*a* (first axial force actuator) of the first actuating unit 10*a* provided for actuating the separating clutch 7 is mounted in the main housing component 44, namely in the first housing region 28*a*. In this fourth step d), a second lever actuator 11*b* (second axial force actuator) provided for actuating the second clutch 9 is also mounted in the main housing component 44, namely in the second housing region 28*b*. This results in an assembly in which the second lever actuator 11*b* is attached on an axial side of the housing wall 29 facing away from the first lever actuator 11*a*.

In a fifth step e), the second clutch component 49 of the separating clutch 7 is attached to the input shaft 4 in a rotationally fixed manner. A second module 53 is thus created.

Furthermore, the first clutch component 48 of the second clutch 9 is connected in a rotationally fixed manner to the input shaft 4. This may also be done in step e). To implement a third module 85, the secondary housing component 47 connected to part of the second clutch component 49 of the second clutch 9 is also provided. The third module 85 is fastened to the main housing component 44. The second clutch 9 with its two clutch components 48, 49 that can be coupled to one another fully assembled and the second lever actuator 11*b* is brought into operative connection with this second clutch 9. The output shaft 8 is already connected in a rotationally fixed manner with the second clutch component 49 of the second clutch 9 in this step.

In a sixth step f), a second module 53 provided by steps c) to e) is connected as a whole to the first module 34 so that the main housing component 44 is connected to the bearing flange 65, the separating clutch 7 with its two clutch components 48, 49 that can be coupled to one another, is fully assembled and the first lever actuator 11*a* is brought into operative connection with the separating clutch 7. Finally, the drive train unit 1 is mounted on the transmission housing 79. The individual method steps a) to f) may be carried out one after the other in alphabetical order. After step f), the third module 85 may then be attached to the second module 53.

In this connection, the various modules 34, 53, 85 can be mounted independently of one another in any order. It is also possible to provide only two of the three modules 34, 53, 85 and connect them to one another.

FIGS. 3 to 5 further describe the self-intensifying structure of the second clutch 9, which is described in detail below. FIGS. 7 and 8 also illustrate control systems 52 which can be implemented in principle and which are designed to control the drive train unit 1. FIG. 7 shows the control system 52 only on the side of a region that interacts with the separating clutch 7. In FIG. 8, the entire control system 52 is also shown with a region, which control system controls the second clutch 9 and the differential gear 32 designed as a rear axle gear.

Figure 2:
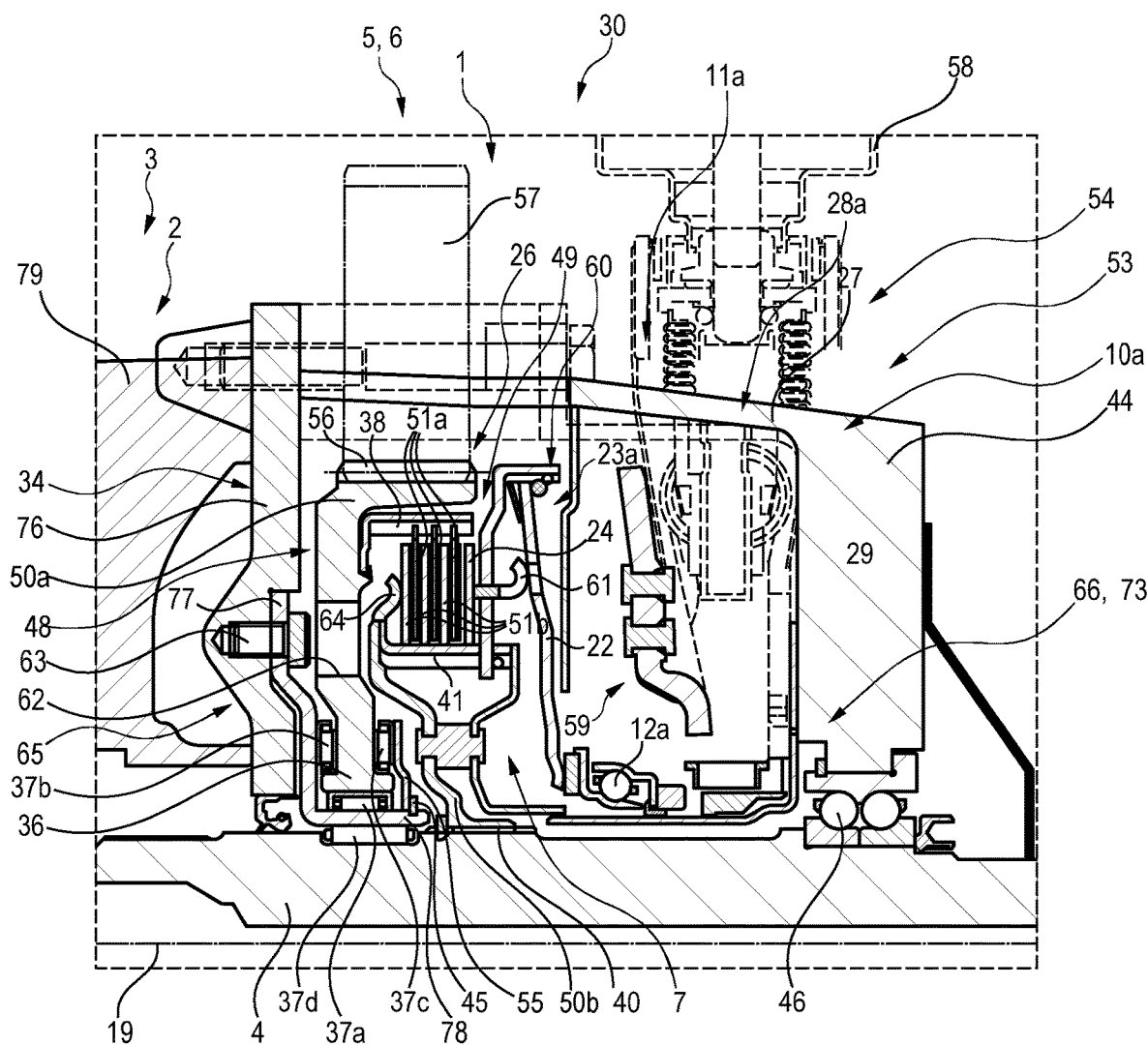
FIG. 2 shows a longitudinal sectional view of a drive train unit designed for a front-wheel drive of a motor vehicle, according to a second exemplary embodiment, wherein the drive train unit is only provided with one single separating clutch.
Figure 9:
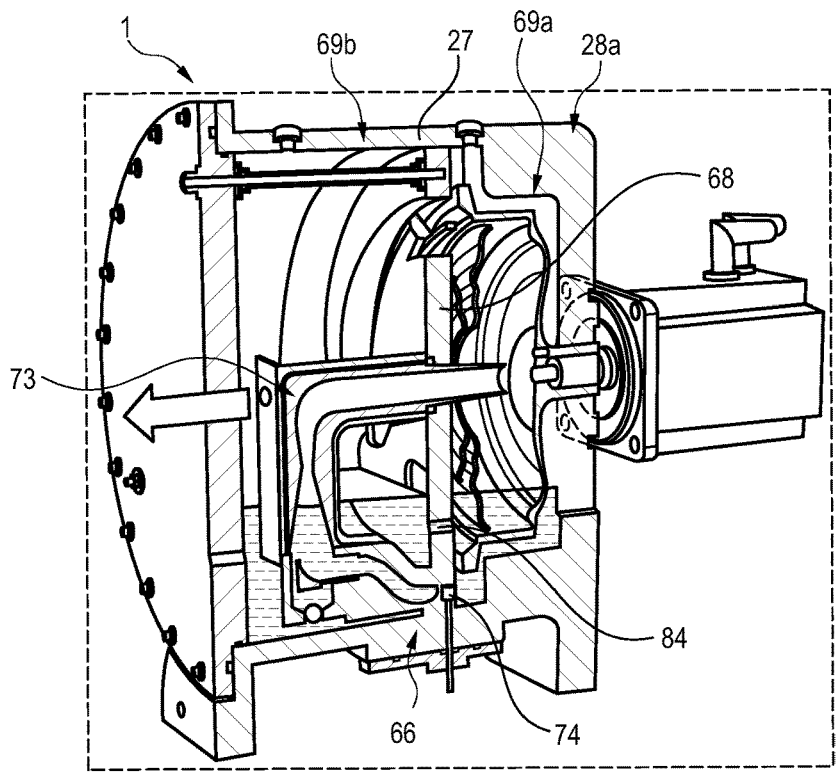
FIG. 9 shows a perspective longitudinal sectional view of a drive train unit according to a third exemplary embodiment in a standing state, wherein the drive train unit is implemented while running wet and has a coolant delivery device.

In connection with FIG. 2, a second exemplary embodiment of the drive train unit 1 is illustrated, wherein this corresponds in structure and function to the first exemplary embodiment. The drive train unit 1 of this second exemplary embodiment is implemented like the first exemplary embodiment with regard to the first housing region 28*a* and the components accommodated by this first housing region 28*a*. In this connection, it should be pointed out that, in principle, the further optional second clutch 9 may also be dispensed with in order to provide a hybrid transmission unit 30, e.g., purely for front-wheel drive. In this embodiment, the drive train unit 1 therefore only has the function of coupling and uncoupling the electric machine 5 from the front wheels of the motor vehicle. The assembly takes place according to the method described above, wherein the partial steps relating to the second clutch 9 are omitted.

With regard to a further aspect, let us return to FIG. 1. As can be seen in FIG. 1, both the first clutch 7 and the second clutch 9 have an actuating unit 10*a*, 10*b* assigned thereto. The first actuating unit 10*a* acting on the first clutch 7 is accommodated together with the first clutch 7 in the first housing region 28*a*. The first actuating unit 10*a* and the first clutch 7 are arranged on a first axial side of the central housing wall 29. The second clutch 9 and the second actuating unit 10b acting on it are arranged on a second axial side of the housing wall 29 facing away from this first axial side. It should be pointed out that the two actuating units 10a, 10b are in principle arranged in a mirror-inverted manner to the housing wall 29, but are essentially constructed in the same way and function in the same way. The function of the two actuating units 10a, 10b is thus described below using the first actuating unit 10a as an example, wherein this function is also applicable to the second actuating unit 10b.

The first actuating unit 10a has the first lever actuator 11a, which is partially shown in FIG. 1. As already mentioned, the first lever actuator 11a is constructed according to the release system of DE 10 2004 009 832 A1. It can also be seen that the first actuating bearing 12a, which is implemented here as a ball bearing, acts on a first actuating force introduction mechanism 23a, which is also received on the first carrier 50a of the first clutch 7 and acts in an adjusting manner on the friction plates 51a, 51b. In this way, an actuating force/axial force can be applied to the entirety of friction plates 51a, 51b in the axial direction and the first clutch 7 can be brought into its closed position.

To support the actuating force, the first actuating force introduction mechanism 23a is received directly on the first carrier 50a, which is also directly connected to the input shaft 4, in such a way that the actuating force is introduced directly into the input shaft 4 via the first carrier 50a and from there via the central support bearing 46 is passed on to the housing wall 29/is supported relative thereto.

The first actuating force introduction mechanism 23a has a lever element 22. The lever element 22 is implemented, for example, as a plate spring. The lever element 22 is pivotably received on a pivot bearing 60 which is fixedly connected to the first carrier 50a. Radially within the pivot bearing 60, the lever element 22 acts in an adjusting manner on an actuator 61 which forms a pressure pot and which in turn acts directly in a shifting manner on the entirety of the friction plates 51a, 51b. Alternatively, the first actuating force introduction mechanism 23a can also be implemented only with the actuator 61 and consequently the first actuating bearing 12a can act directly on the actuator 61 in an adjusting manner.

On a side of the set of friction plates 51a, 51b axially facing away from the actuator 61, a counter support region 64 is arranged, which counter support region 64 is also directly connected to the first carrier 50a in order to achieve a closed force curve in the first carrier 50a and the actuating force to be introduced as completely as possible into the input shaft 4 via the first carrier 50a.

As already mentioned, the second actuating unit 10b is constructed and functioning in accordance with the first operating unit 10a. Accordingly, the second actuating unit 10b in turn serves to apply force to the entirety of the friction elements 14, 20 of the second clutch 9 by means of a second actuating force introduction mechanism 23b. It can be seen here that, due to the self-intensifying design of the second clutch 9, a first carrier part 15 of the first carrier 35 of the second clutch 9, which accommodates the second actuating force introduction mechanism 23b, with a second carrier part 17, attached directly to the input shaft 4, via several leaf spring units 16 including a plurality of leaf springs 18. The counter support region 64 of the second clutch 9 is coupled directly to the second carrier part 17.

A further aspect of the disclosure is illustrated in FIGS. 9 to 16. FIGS. 9 to 16 illustrate two further exemplary embodiments of the drive train unit 1, which exemplary embodiments, however, are in principle constructed and function according to the first and second exemplary embodiments. For the sake of brevity, only the differences between these exemplary embodiments are explained below.

Figure 15:
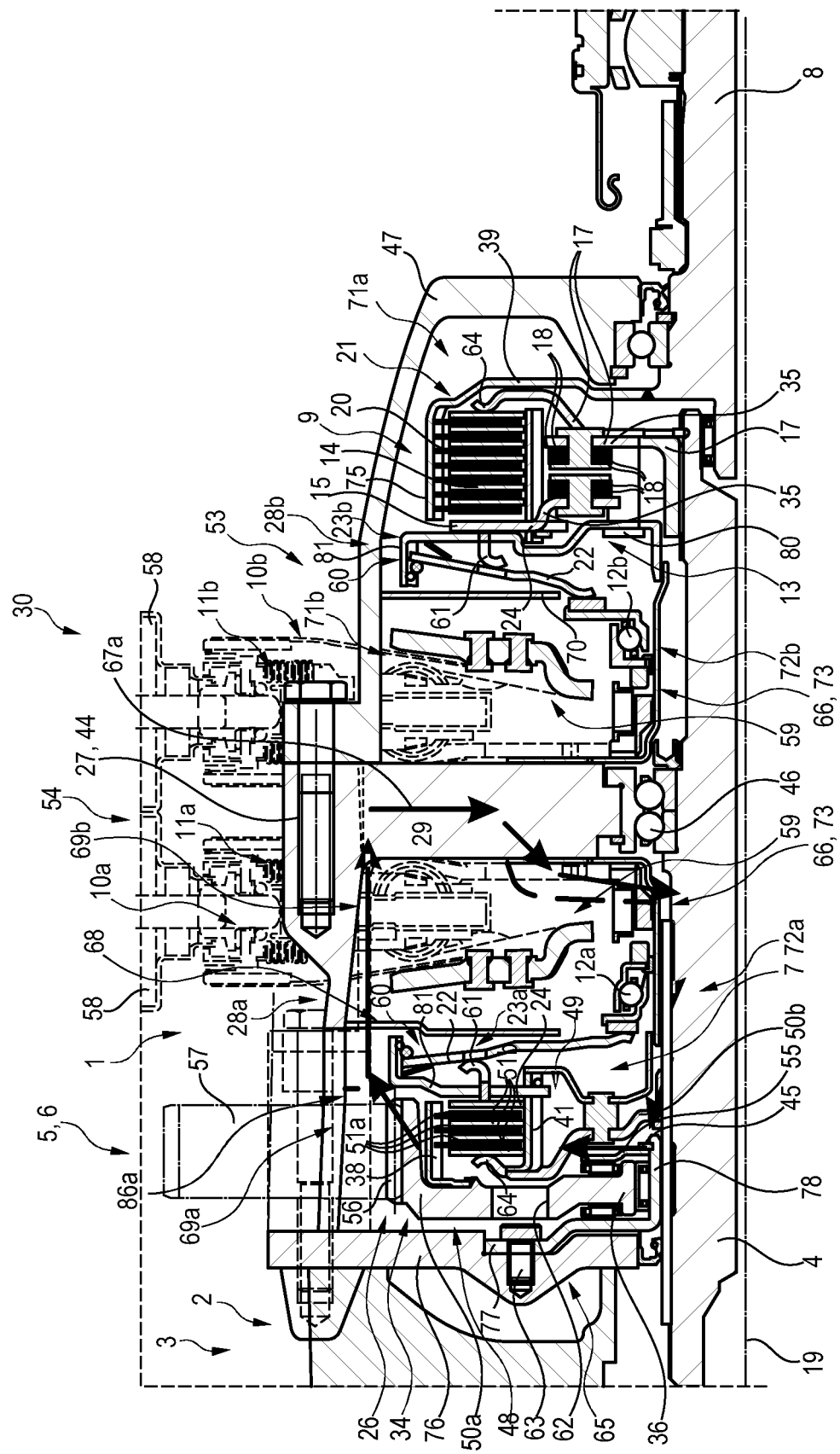
FIG. 15 shows a longitudinal cut-away view of a drive train unit according to a fourth exemplary embodiment, wherein a coolant delivery device is also provided and a hydraulic medium flow built up by the separating clutch is shown.
Figure 16:
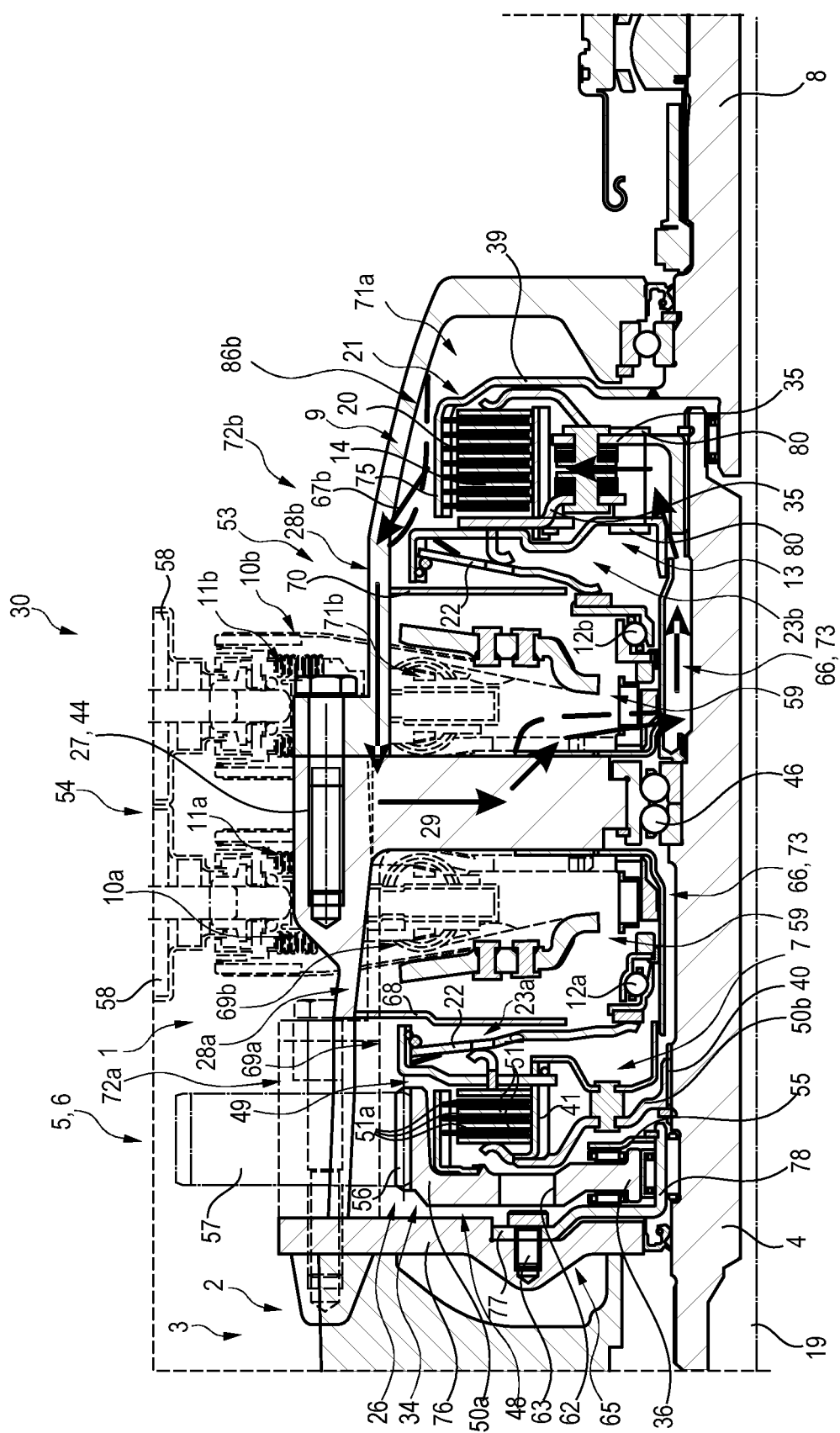
FIG. 16 shows a longitudinal cut-away view of the drive train unit according to FIG. 15, wherein a hydraulic medium flow built up by the further clutch during operation is now shown.

The drive train unit 1 according to FIGS. 9 to 14 is essentially constructed according to the second exemplary embodiment in FIG. 2. The drive train unit 1 of the third exemplary embodiment now additionally has a coolant delivery device 66, which is illustrated in its basic structure. The coolant delivery device 66 is shown in the fourth exemplary embodiment of FIGS. 15 and 16 just once for the two clutches 7, 9, since the coolant delivery devices 66 function identically. The function and structure of the coolant delivery devices 66 of FIGS. 15 and 16 are thus explained below on the coolant delivery device 66 of FIGS. 9 to 14.

The coolant delivery device 66 has a jet pump 73 which can be readily seen in FIGS. 9 to 14, and is arranged in part in a hydraulic fluid sump which is located in the installation position in a lower half of the housing 27. The coolant delivery device 66 is designed as in such a way that it generates or supports a first coolant circuit 67a by means of the jet pump 73 when the input shaft 4 rotates in the first housing region 28a.

The first housing region 28a which accommodates the separating clutch 7 and the first actuating unit 10a is acted upon by the first coolant circuit 67a during operation. A first bulkhead element 68 protrudes into the first housing region 28a in such a way that it divides it into two subspaces 69a, 69b. The first bulkhead element 68, which is implemented as a bulkhead plate, generates a flow through the hydraulic medium accommodated in a second subspace 69b accommodating the first actuating unit 10a. The first coolant circuit 67a is consequently directed to a first subspace 69a which receives the separating clutch 7.

Figure 10:
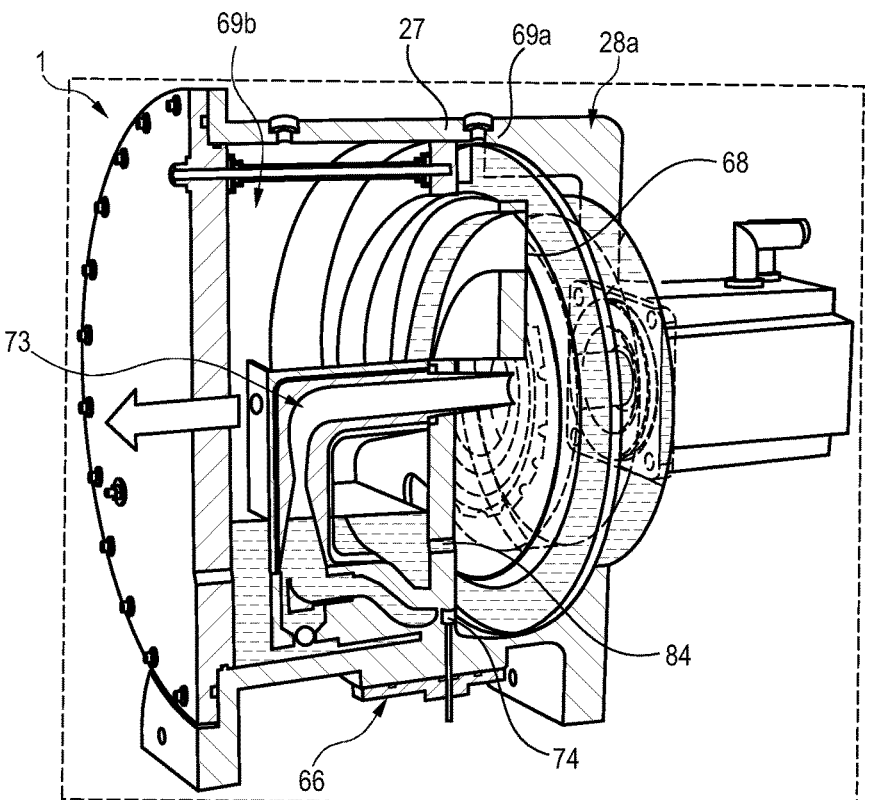
FIG. 10 shows a perspective longitudinal sectional view of the drive train unit according to FIG. 9, wherein the input shaft is now moved at a certain speed so that a certain amount of coolant is already in the rotating region of the drive train unit.
Figure 11:
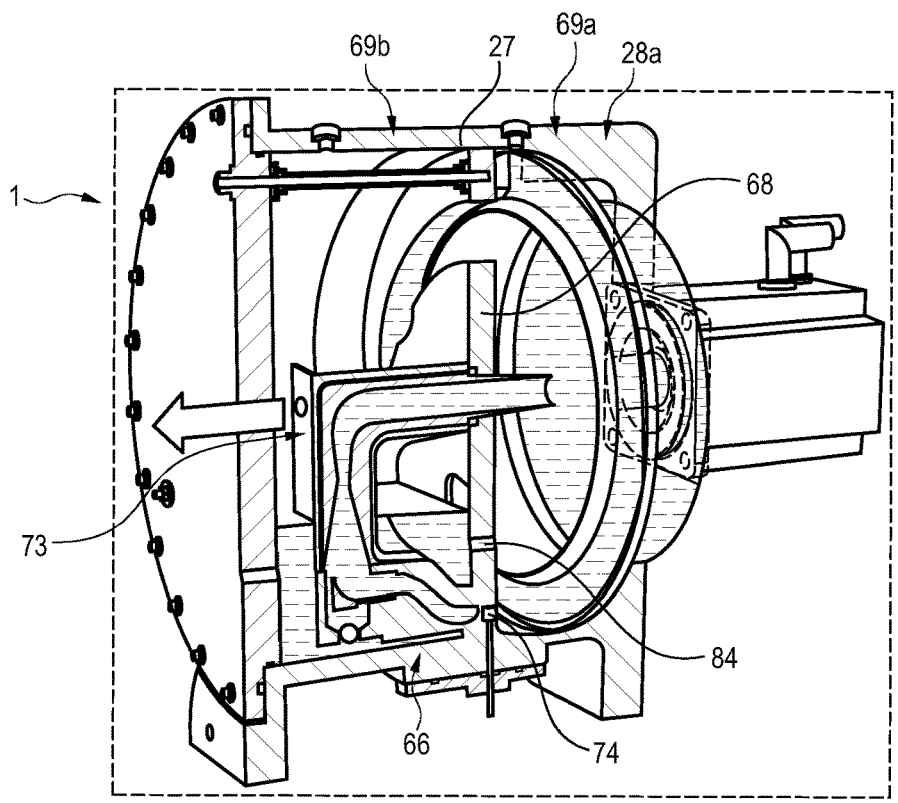
FIG. 11 shows a perspective longitudinal sectional view of the drive train unit according to FIG. 9, wherein a plate for diverting the hydraulic medium is now slightly opened so that a higher proportion of coolant compared to FIG. 10 is built up in the rotating part of the drive train unit.
Figure 12:
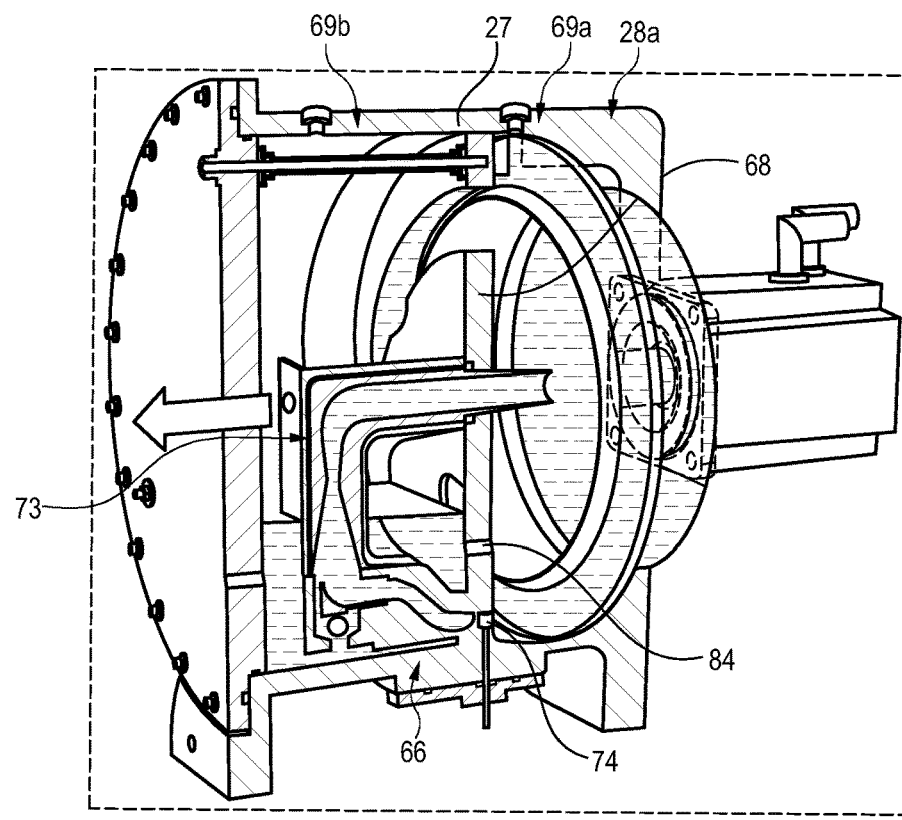
FIG. 12 shows a perspective longitudinal sectional view of the drive train unit according to FIG. 9 with a completely open flap, so that, compared to FIG. 11, further hydraulic medium is conveyed into the rotating part of the drive train unit.
Figure 13:
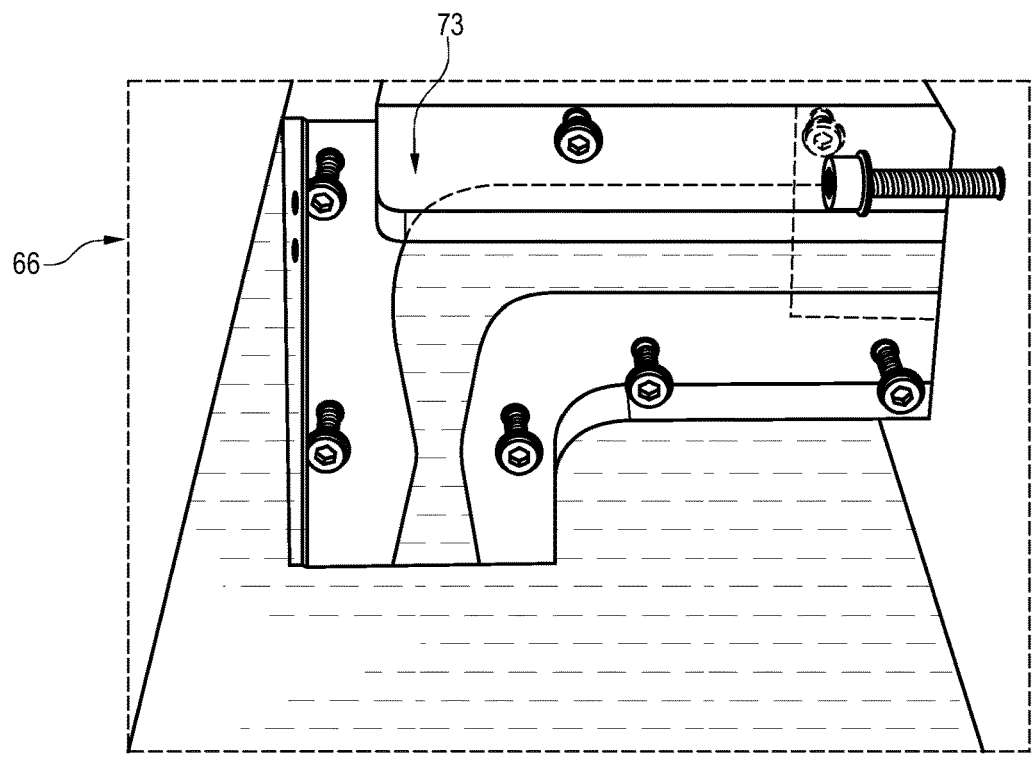
FIG. 13 is a perspective view of a longitudinal cut-away of the jet pump used in the coolant delivery device of FIGS. 9 to 12, wherein the hydraulic medium has a minimum level.
Figure 14:
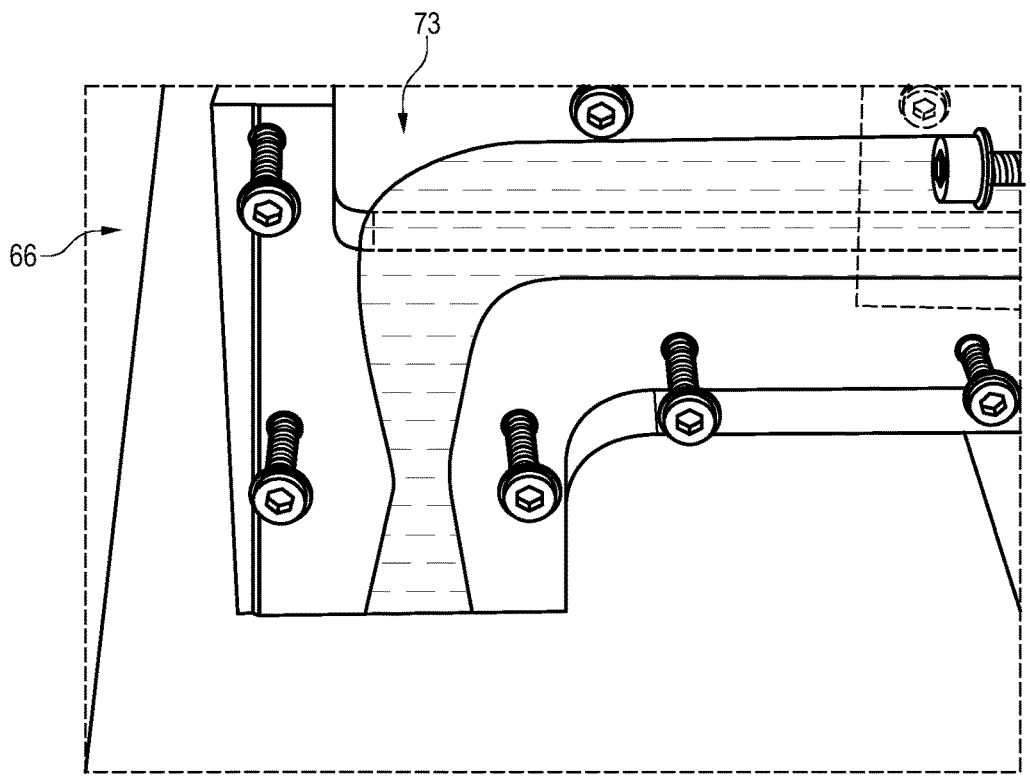
FIG. 14 shows a perspective view of a longitudinal cut-away of the region of the jet pump of FIG. 13, wherein a maximum level for conveying the hydraulic medium is now achieved.

Furthermore, as shown in FIGS. 10 to 12, a valve element 74 is additionally arranged in the coolant delivery device 66, which allows a flow regulation of the coolant in the first coolant circuit 67a with the input shaft 4 rotating.

The coolant delivery devices 66 of FIGS. 15 and 16 are designed in such a way that they each generate a coolant circuit 67a, 67b both in the first housing region 28a and in the second housing region 28b with the input shaft 4 rotating and thus the clutches 7, 9 rotating. The jet pump(s) 73 is/are at least partially integrated on the housing wall 29.

As likewise shown in FIGS. 15 and 16, the respective coolant delivery device 66 has a schematically illustrated discharge element 86a, 86b. The discharge element 86a, 86b is designed in such a way that it enables the coolant flowing in the circumferential direction to be deflected into a channel in the radially inward direction. The discharge element 86a has, for example, a blade contour. The channel is implemented, for example, by a bore and initially runs axially to the housing wall 29 and from there inward in the radial direction to the input shaft 4. A first discharge element 86a is accommodated in the first subspace 69a.

The second housing region 28b is divided in the same way as the first housing region 28a. For this purpose, a second bulkhead element 70 (also designed as a bulkhead plate) is provided, which divides the second housing region 28b into two subspaces 71a, 71b. According to FIG. 16, this also enables a fluid flow from a second subspace 71b, which accommodates the second actuating unit 10b, into a first subspace 71a. The second coolant circuit 67b arises in the first subspace 71a, which flows around the friction elements 14, 20 of the second clutch 9 in the radial direction and thus cools during operation. A valve element 74, which enables the flow of the coolant in the coolant circuits 67a, 67b to be regulated, is arranged for each clutch 7, 9. A second discharge element 86b is accommodated in the first subspace 71a.

As a result, a total of two independently controllable hydraulic subsystems 72a, 72b, each with a coolant delivery device 66 or, alternatively, a coolant delivery device 66 are made available, each of which makes the corresponding coolant circuit 67a, 67b controllable by the respective clutch 7, 9. This allows effective cooling of the respective clutch 7, 9.

According to the present aspect, as shown in FIGS. 1 and 3 and in connection with FIGS. 4 and 5, the second clutch 9 implemented as a friction clutch, which in further embodiments is also to be regarded as a unit detached from the first clutch 7 and the electric machine 5, is implemented as a self-intensifying clutch. This second clutch 9 according to the disclosure has the first clutch component 13 equipped with the two-part (first) carrier 35. The first carrier part 15 of this first carrier 35 is that component which directly receives the plurality of first friction elements 14 in a rotationally fixed manner and axial displacement relative to one another. For this purpose, the first carrier part 15 typically has a sleeve-shaped (second) receiving region 83, on the radial outside of which the first friction elements 14 are attached.

The first carrier part 15 also has a pressing plate 24 which is displaceable in the axial direction and which has an adjusting effect at the end on the entirety of the friction elements 14, 20 of the second clutch 9. The pressing plate 24 is formed here by a plate element which is received separately on the second receiving region 83, but in further embodiments can also be formed as one of the friction elements 14, 20.

The second carrier part 17 is connected to the first carrier part 15, which second carrier part 17 is that part of the first carrier 35 which is attached directly (by means of a serration) to the input shaft 4. The second carrier part 17 forms a counter-support region 64 on an axial side of the totality of friction elements 14, 20 facing away from the pressing plate 24. The counter support region 64 serves to directly support an axial force/actuating force which compresses the friction elements 14, 20 in a closed position of the second clutch 9. In the closed position, the actuating force is typically introduced via the second actuating force introduction mechanism 23b to the entirety of the friction elements 14, 20 (via the pressing plate 24).

The second actuating force introduction mechanism 23b is fixed to the second carrier part 17. A plurality of stud bolts 80 distributed in the circumferential direction are used to fix a bearing section 81 of the second actuating force introduction mechanism 23b formed from a separate sheet metal to the second carrier part 17 or to design it as a component of this second carrier part 17. The lever element 22 is pivotably mounted on the mounting section 81. The lever element 22 is implemented, for example, as a plate spring. A second actuating bearing 12b acts on the lever element 22 and, in turn, the second lever actuator 11b of the second actuating unit 10b acts on this second actuating bearing 12b.

A plurality of leaf spring units 16 are provided distributed between the two carrier parts 15, 17 along a circumference of an imaginary circular line running around the central axis of rotation 19. Each leaf spring unit 16 has a plurality of leaf springs 18, here five by way of example, which are arranged to form a leaf spring assembly. Accordingly, the leaf springs 18 within a leaf spring unit 16 are formed substantially identically and lie flat on one another. Each leaf spring 18 of the leaf spring unit 16, as can be seen particularly well in connection with FIG. 4, is provided with a set angle α. The set angle α is selected so that in the closed position of the second clutch 9, a torque transmitted by the clutch 9 in a driving direction of rotation (pull) increases the axial force/actuating force of the second clutch 9 in a self-intensifying manner.

Accordingly, the force $F_z$ is also applied in order to increase the existing axial actuating force F. In the case of a direction of rotation (thrust) opposite to this drive direction of rotation, however, the axial force is reduced by a corresponding amount. As can also be seen in connection with FIG. 5, the gain factor increases in principle with an increasing set angle α of the respective leaf spring 18. It becomes clear here that the set angle α may be selected between 6° and 10°, e.g., between 6.5° and 9.5°. This represents a suitable compromise between an increase in the axial force and a stability of the leaf springs 18.

In FIG. 3, two of the leaf spring units 16 can be seen in section. A first leaf spring unit 16 on the side of its first end fixed to the first carrier part 15 (via a rivet 82) and a second leaf spring unit 16 on the side of its, on the second carrier part 17 (via a rivet 82) fixed second end can be seen.

According to further embodiments, the separating clutch 7 is also implemented as a self-intensifying clutch according to the structure of the second clutch 9.

The second carrier 39 also has a second sleeve region 75, on the radial inside of which the plurality of second friction plates 51b are received in a rotationally fixed manner and are axially displaceable relative to one another.

In other words, according to the disclosure, an automatic transmission 30 is provided with a P3 electric machine 5 arranged at the transmission output 2, which can be connected and disconnected by means of a separating clutch 7 and optionally an all-wheel clutch 9 (so-called Quattro clutch) for connecting and disconnecting the Cardan shaft 25, which leads to the distribution gear 32. The system thus hybridizes the transmission 3 to implement the classic hybrid functions (electric driving, braking and thrust energy recovery, sailing, boost) using an electric machine 5 with a separating clutch 7 and an all-wheel drive clutch 9 for shifting the Cardan shaft 25, if required.

The system is arranged in a modular way so that the hybridization can be installed in both front-wheel drive and all-wheel drive (with or without Quattro unit), i.e. the all-wheel drive clutch can also be omitted in front-wheel drive applications. For reasons of installation space, the electric machine 5 can be connected axially parallel to the drive train 31 and the separating clutch 7 via a gear stage 26. The separating clutch 7 is located in the power flow after the gear stage 26 and before the drive train 31. As a result, the gear losses and bearing drag torque losses are avoided when the separating clutch 7 is open. An integrated passive transfer mechanism 66 including bulkhead element 68, 70 prevents the clutches 7, 9 from splashing in the oil sump and realizes the clutch cooling. Both clutches 7, 9 are actuated by a mechanical actuator 11a, 11b, which are mounted on a central housing wall 29. The separating clutch 7 is thus operated from the rear and the Quattro clutch 9 from the front. This enables modularization in a simple manner.

In principle, in the case of the all-wheel clutch/all-wheel separating clutch (second clutch 9), which is intended to transmit a very high torque, the torque could be transmitted via a large lever transmission or a large number of plates 14, 20. However, in the front-wheel drive mode (i.e., all-wheel clutch open), there are high demands on a low drag torque, which requires a small number of plates and high pressing forces. Furthermore, the corner energy (engagement force times engagement travel) should be kept small in order to use actuators with low energy consumption. The lever actuator is provided here. Therefore, according to the embodiment, so-called integrated self-intensification is used.

The inner plate carrier (first carrier 35) is divided and connected to the hub via leaf springs 18. The leaf springs 18 are installed in the circumferential direction and transmit the entire torque. Furthermore, they enable an axial displacement of the inner plate carrier 35 (including the pressing plate 24) and can generate the necessary restoring force for the actuator 11b. The leaf springs 18 are installed in such a way that they have an arrangement when the clutch 9 is closed. The torque transmitted when the clutch 9 is closed, which is completely routed via the leaf springs 18, leads to an additional axial force which acts on the plate set 14, 20. Here, the circumferential force applied to the leaf springs 18 is converted into an additional axial force due to the axial positioning of the leaf springs 18 (FIG. 4). The leaf springs 18 are installed in such a way that the traction torque is increased. The intensification force is thus supported internally.

In the opposite torque direction (thrust direction), there is a reduction in the static pressing force and thus in the torque which can be transmitted. The intensifying effect of the leaf springs 18 can be changed by varying the installation angle. Further parameters influencing the intensification are the coefficient of friction, number of plates, mean friction radius and effective diameter of the leaf spring 18. However, these are largely determined by the installation space dimensions and can only be varied to a limited extent. This solution of the lever-operated clutch 9 with self-intensification can generally be used in clutches 9 and is not necessarily tied to the separating clutch region.

The actuator force is introduced via a lever mechanism 59. The lever mechanism 59 itself is supported by stud bolts 80 and transferred to the hub, which in turn is mounted on the shaft 4. The clutch 9 is consequently not actuated directly.

REFERENCE NUMERALS

1 Drive train unit
2 Output
3 Transmission
4 Input shaft
5 Electric machine
6 Rotor
7 Separating clutch/first clutch
8 Output shaft
9 Friction clutch/second clutch
10a First actuating unit
10b Second actuating unit
11a First lever actuator
11b Second lever actuator
12a First actuating bearing
12b Second actuating bearing
13 First clutch component of the friction clutch
14 First friction element of the friction clutch
15 First carrier part
16 Leaf spring unit
17 Second carrier part
18 Leaf spring
19 Axis of rotation
20 Second friction element of the friction clutch
21 Second clutch component of the friction clutch
22 Lever element
23a First actuating force introduction mechanism
23b Second actuating force introduction mechanism
24 Pressing plate
25 Cardan shaft
26 Gear stage
27 Housing
28a First housing region
28b Second housing region
29 Housing wall
30 Transmission unit
31 Drive train
32 Differential gear
33 Internal combustion engine
34 First module
35 First carrier of the friction clutch
36 Bearing pedestal
37a First roller bearing
37b Second roller bearing
37c Third roller bearing
37d Fourth roller bearing
38 First receiving region
39 Second carrier of the friction clutch
40 Serration
41 First sleeve region
42 Rotor rotational axis
43 Rotor shaft
44 Main housing component
45 Securing ring
46 Support bearing
47 Secondary housing component
48 First clutch component of the separating clutch
49 Second clutch component of the separating clutch
50a First carrier of the separating clutch
50b Second carrier of the separating clutch
51a First friction plate of the separating clutch
51b Second friction plate of the separating clutch
52 Control system
53 Second module
54 Clutch device
55 Shim
56 Toothing
57 Gearwheel
58 Electric motor
59 Lever mechanism
60 Pivot bearing
61 Actuating member
62 Through hole
63 Fastening means
64 Counter support region
65 Bearing flange
66 Coolant delivery device
67a First coolant circuit
67b Second coolant circuit
68 First bulkhead element
69a First subspace of the first housing region
69b Second subspace of the first housing region
70 Second bulkhead element
71a First subspace of the second housing region
71b Second subspace of the second housing region
72a First subsystem
72b Second subsystem
73 Jet pump
74 Valve element
75 Second sleeve region
76 Base body
77 Support element
78 Bearing region 79 Transmission housing
80 Stud bolt
81 Bearing section
82 Rivet
83 Second receiving region
84 Opening
85 Third module
86a First discharge element
86b Second discharge element

The invention claimed is:

1. A drive train unit for a hybrid vehicle, comprising:
an input shaft arranged for rotationally fixed attachment to an output of a transmission and comprising an axis of rotation;
an output shaft;
an electric machine comprising a rotor;
a friction clutch operatively inserted between the input shaft and the output shaft, the friction clutch comprising:
  a first clutch component comprising:
    a first carrier part;
    a first friction element installed in the first carrier part;
    a leaf spring unit comprising a leaf spring; and
    a second carrier part rotationally fixed to the first carrier part by the leaf spring unit; and
  a second clutch component comprising a second friction element, wherein, in a closed position of the friction clutch, the leaf spring is adjusted at a set angle relative to a reference plane oriented perpendicular to the axis of rotation such that, in a driving direction of the first clutch component, the first friction element is applied to the second friction element with an additional axial force; and
an actuating unit operatively connected to the friction clutch, the actuating unit comprising:
  an actuator; and
  an actuating bearing, displaceable by the actuator.

2. The drive train unit of claim 1, wherein:
the actuator is a lever actuator; or
the actuator is a hinge actuator.

3. The drive train unit of claim 1, wherein the friction clutch is a self-intensifying clutch.

4. The drive train unit of claim 1, wherein the leaf spring unit comprises a plurality of leaf springs arranged to form a leaf spring set.

5. The drive train unit of claim 1, wherein the first clutch component comprises a plurality of leaf spring units are arranged distributed along a circumference of the first carrier part or the second carrier part.

6. The drive train unit of claim 1, wherein the leaf spring unit is arranged radially inside of the first friction element and the second friction element.

7. The drive train unit of claim 1, further comprising an actuating force introduction mechanism, wherein:
the actuating force introduction mechanism comprises:
  a lever element operatively connected to the actuator; or
  a pressure pot operatively connected to the actuator; and
the actuating force introduction mechanism is arranged on the second carrier part.

8. The drive train unit of claim 7, wherein the actuating force introduction mechanism comprises a pressing plate:
connected to the first carrier part; and
arranged to operate on the first friction element and the second friction element in a displaceable manner.

9. A transmission unit for a hybrid vehicle, comprising:
the drive train unit of claim 1; and
the transmission connected to the input shaft.

10. A drive train for a hybrid vehicle, comprising:
the transmission unit of claim 9; and
a differential gear coupled to the output shaft in a rotationally fixed manner.

* * * * *